United States Patent
Zhu

(10) Patent No.: US 12,422,153 B2
(45) Date of Patent: Sep. 23, 2025

(54) HUMIDIFIER

(71) Applicant: BEIJING XIAOMI MOBILE SOFTWARE CO., LTD., Beijing (CN)

(72) Inventor: Kenan Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 269 days.

(21) Appl. No.: 17/875,165

(22) Filed: Jul. 27, 2022

(65) Prior Publication Data

US 2023/0314017 A1 Oct. 5, 2023

(30) Foreign Application Priority Data

Mar. 31, 2022 (CN) .......................... 202210344787.8

(51) Int. Cl.
| | |
|---|---|
| *F24F 6/02* | (2006.01) |
| *F24F 6/00* | (2006.01) |
| *G01F 23/60* | (2006.01) |
| *G01F 23/62* | (2006.01) |

(52) U.S. Cl.
CPC .......... *F24F 6/02* (2013.01); *F24F 2006/008* (2013.01); *G01F 23/606* (2013.01); *G01F 23/62* (2013.01)

(58) Field of Classification Search
CPC ........ F24F 6/02; F24F 2006/008; F24F 11/89; F24F 6/12; F24F 13/00; F24F 11/0008; F24F 6/00; F24F 13/20; G01F 23/606; G01F 23/62; G01F 23/72; Y02B 30/70
See application file for complete search history.

(56) References Cited

U.S. PATENT DOCUMENTS

| | | | | |
|---|---|---|---|---|
| 4,563,313 | A * | 1/1986 | Tsuaki | F24F 6/12 392/394 |
| 2004/0108604 | A1* | 6/2004 | Pan | F24F 6/00 261/26 |
| 2006/0118977 | A1* | 6/2006 | Huang | F24F 6/00 261/DIG. 65 |
| 2007/0152356 | A1* | 7/2007 | Huang | F24F 6/00 261/81 |
| 2012/0222548 | A1* | 9/2012 | Lev | F24F 6/12 261/119.1 |

(Continued)

FOREIGN PATENT DOCUMENTS

| | | |
|---|---|---|
| CN | 203083660 U | 7/2013 |
| CN | 103604187 A * | 2/2014 |

(Continued)

OTHER PUBLICATIONS

Japanese Patent Application No. 2022-121667, Office Action dated Aug. 22, 2023, 10 pages.

(Continued)

*Primary Examiner* — Stephen Hobson
(74) *Attorney, Agent, or Firm* — Cozen O'Connor

(57) ABSTRACT

A humidifier includes a pedestal, a water tank, a float, and a detection device. The water tank is detachably mounted on a top of the pedestal. The float is on the water tank and movable relative to the water tank. The detection device is on the pedestal and configured to detect a position of the float in a preset space of the humidifier. In the preset space, the position of the float indicates whether the water tank is separated from the pedestal and whether the water tank is short of water.

17 Claims, 6 Drawing Sheets

(56) References Cited

U.S. PATENT DOCUMENTS

| | | | | |
|---|---|---|---|---|
| 2015/0153058 | A1* | 6/2015 | Chen | F24F 11/30 |
| | | | | 261/129 |
| 2016/0146490 | A1* | 5/2016 | McDonnell | F24F 6/12 |
| | | | | 261/70 |
| 2016/0356514 | A1* | 12/2016 | Cai | F24F 13/20 |
| 2017/0122606 | A1* | 5/2017 | Son | G01F 23/0007 |
| 2017/0182266 | A1* | 6/2017 | Power | A61M 11/06 |
| 2018/0180310 | A1* | 6/2018 | Abel | H01H 35/18 |
| 2019/0041084 | A1* | 2/2019 | Atkins, Jr. | F24F 6/14 |
| 2019/0041086 | A1* | 2/2019 | Atkins, Jr. | F24F 6/14 |
| 2019/0049133 | A1* | 2/2019 | Cai | A61L 9/015 |
| 2019/0063768 | A1* | 2/2019 | Chen | F24F 11/88 |
| 2020/0096213 | A1* | 3/2020 | Liang | F24F 6/12 |
| 2020/0103140 | A1* | 4/2020 | Davis | F24F 3/14 |
| 2021/0332994 | A1* | 10/2021 | Abel | F24F 11/0008 |
| 2022/0048794 | A1* | 2/2022 | Zhang | C02F 1/008 |
| 2022/0065492 | A1* | 3/2022 | Niedermann | F24F 6/12 |
| 2022/0113043 | A1* | 4/2022 | Morrison | F24F 6/043 |
| 2023/0149659 | A1* | 5/2023 | Xu | A61M 21/02 |
| | | | | 600/27 |
| 2023/0175715 | A1* | 6/2023 | Smith | F24F 13/20 |
| | | | | 96/243 |
| 2023/0204249 | A1* | 6/2023 | Kim | F24F 13/20 |
| | | | | 392/402 |
| 2023/0213220 | A1* | 7/2023 | Wolf | F24F 8/98 |
| | | | | 261/29 |

FOREIGN PATENT DOCUMENTS

| | | | | |
|---|---|---|---|---|
| CN | 204285709 | U | | 4/2015 |
| CN | 107036228 | A * | 8/2017 | F24F 13/28 |
| CN | 107101308 | A * | 8/2017 | F24F 6/06 |
| CN | 206786957 | U * | 12/2017 | |
| CN | 107655131 | A * | 2/2018 | F24F 11/0008 |
| CN | 207094926 | U | 3/2018 | |
| CN | 109869858 | A | 6/2019 | |
| CN | 211233278 | U | 8/2020 | |
| CN | 113154574 | A * | 7/2021 | F24F 6/18 |
| CN | 114608190 | A * | 6/2022 | F24F 11/30 |
| CN | 114719364 | A * | 7/2022 | F24F 13/00 |
| EP | 1260772 | A1 * | 11/2002 | F24F 6/00 |
| JP | 2000266370 | A | 9/2000 | |
| JP | 2015522304 | A | 8/2015 | |
| KR | 200438801 | | 3/2008 | |
| KR | 20130059164 | A * | 6/2013 | G01F 23/38 |
| KR | 20170139283 | A | 12/2017 | |
| KR | 20190088867 | A | 7/2019 | |
| WO | WO-2008060089 | A1 * | 5/2008 | F24F 6/12 |
| WO | WO-2012091369 | A2 * | 7/2012 | F24F 6/043 |
| WO | WO-2015039259 | A2 * | 3/2015 | F24F 8/108 |
| WO | WO-2019111667 | A1 * | 6/2019 | B05B 17/0615 |
| WO | WO-2022039485 | A1 * | 2/2022 | F24F 6/025 |

OTHER PUBLICATIONS

Japanese Patent Application No. 2022-121667, English translation of Office Action dated Aug. 22, 2023, 16 pages.
Korean Patent Application No. 10-2022-0092392, Office Action dated Oct. 5, 2023, 5 pages.
Korean Patent Application No. 10-2022-0092392, English translation of Office Action dated Oct. 5, 2023, 10 pages.
Chinese Patent Application No. 202210344787.8, Office Action dated Oct. 19, 2023, 6 pages.
Chinese Patent Application No. 202210344787.8, English translation of Office Action dated Oct. 19, 2023, 12 pages.
European Patent Application No. 22187589.1, Office Action dated May 2, 2023, 11 pages.

* cited by examiner

HUMIDIFIER

CROSS-REFERENCE TO RELATED APPLICATION

The present application is based on and claims priority to Chinese Patent Application No. 202210344787.8 filed on Mar. 31, 2022, the entire contents of which are incorporated herein by reference.

BACKGROUND

A humidifier is a household appliance that increases the humidity in the room. In the related art, the detection device for detecting the water level of the humidifier and the device for detecting the separation of the water tank are two separate devices, which are relatively expensive and complicated in structure.

SUMMARY

The present disclosure relates to a field of humidifiers, and more particularly, to a humidifier.

A humidifier according to embodiments of the present disclosure includes a pedestal, a water tank, a float, and a detection device. The water tank is detachably mounted on a top of the pedestal. The float is on the water tank and movable relative to the water tank. The detection device is on the pedestal and configured to detect a position of the float in a preset space of the humidifier. In the preset space, the position of the float indicates whether at least one of: (i) the water tank is separated from the pedestal, and (ii) the water tank is short of water.

DETAILED DESCRIPTION

Figure 1:
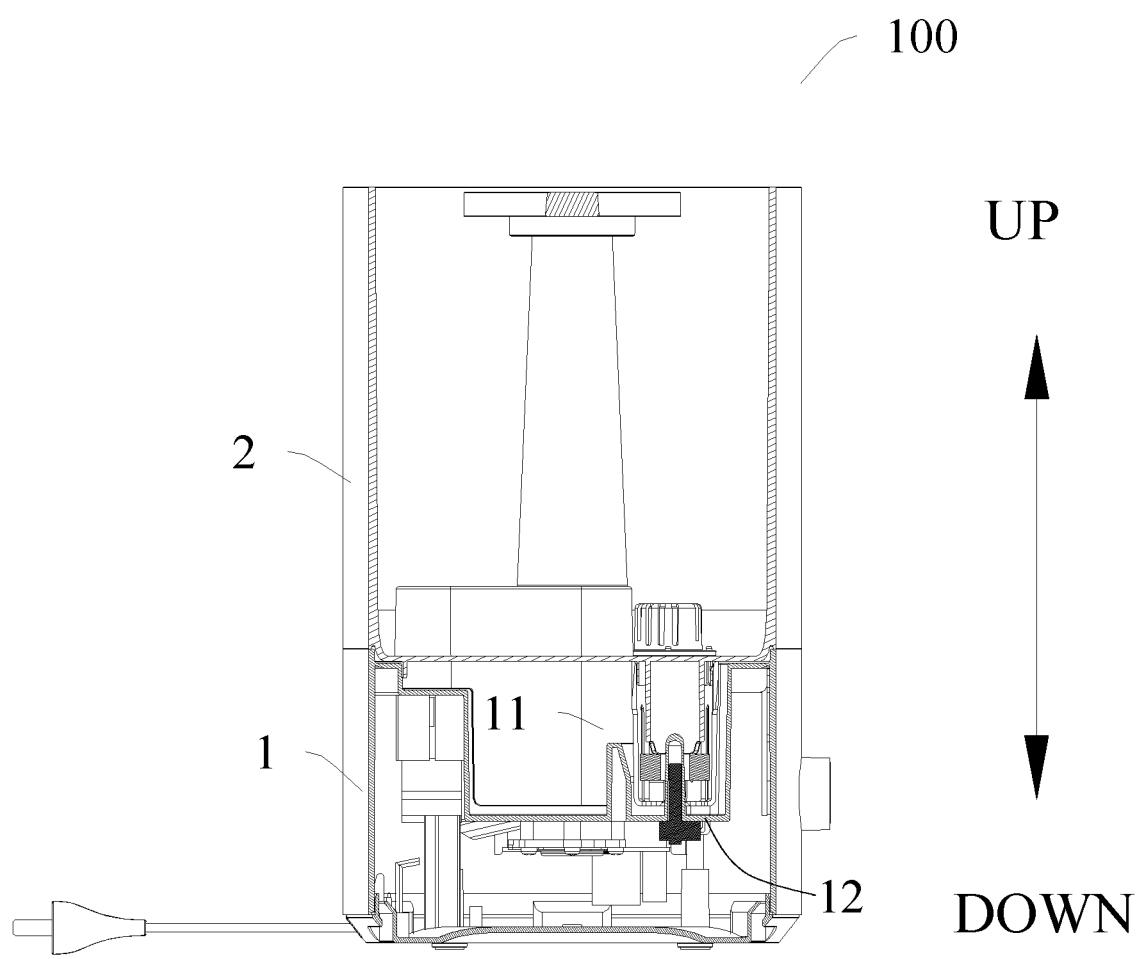
FIG. 1 is a schematic diagram showing a humidifier in accordance with an embodiment of the present disclosure.

Embodiments of the present disclosure are described in detail below, and examples of the described embodiments are shown in accompanying drawings. The following embodiments described with reference to the accompanying drawings are exemplary and are intended to explain the present disclosure rather than limit the present disclosure.

A humidifier 100 according to embodiments of the present disclosure will be described below with reference to the accompanying drawings. As shown in FIGS. 1 to 7, the humidifier 100 according to embodiments of the present disclosure includes a pedestal 1, a water tank 2, a float 5 and a detection device.

The water tank 2 is detachably mounted on a top of the pedestal 1. The float 5 is on the water tank 2 and is movable relative to the water tank 2. The detection device is on the pedestal 1 and configured to detect a position of the float 5 in a preset space of the humidifier 100, in which the position of the float 5 is used to indicate whether the water tank 2 is separated from the pedestal 1 and whether the water tank 2 is short of water.

For the humidifier 100 according to the embodiments of the present disclosure, by arranging the float 5 on the water tank 2 and making the float 5 movable relative to the water tank 2, when the water tank 2 is separated from the pedestal 1, the float 5 is also separated from the pedestal 1 along with the water tank 2. That is, the separation of the float 5 from the pedestal 1 represents the separation of the water tank 2 from the pedestal 1. When the water tank 2 is mounted on the top of the pedestal 1, the float 5 floats up and down within the preset space of the humidifier 100, and a floating position of the float 5 can indicate a water level in the preset space. The float 5 floats up and down along with the water level in the humidifier 100 (the water tank 2 or the pedestal 1). When the water tank 2 is not short of water, the floating position of the float 5 in the preset space is higher; when the water tank 2 is short of water, the floating position of the float 5 in the preset space is lower.

The position of the float 5 is used to indicate whether the water tank 2 is separated from the pedestal 1 and whether the water tank 2 is short of water. The detection device is used to detect the position of the float 5 in the preset space of the humidifier 100. Specifically, the detection device is used to detect a position, in an up-down direction, of the float 5 in the preset space of the humidifier 100. When the detection device detects that the float 5 is below a lower water level in the preset space of the humidifier 100, such information can be sent to a central control system to determine that the water tank 2 is short of water. When the detection device detects that the float 5 is above the lower water level in the preset space of the humidifier 100, such information can be sent to the central control system to determine that the water tank 2 is not short of water. When the detection device detects that the float 5 is above a certain preset position in the preset space of the humidifier 100 or that the float 5 is not in the preset space, it means that the float 5 is leaving the preset space of the humidifier 100 or has already left the preset space of the humidifier 100, and such information is sent to the central control system to determine that the water tank 2 is separated from the pedestal 1.

When it is determined that the water tank 2 is short of water or the water tank 2 is separated from the pedestal 1, an atomizer and a fan can be turned off (after a preset time), reducing energy consumption of the humidifier 100. Compared with the need for two sets of detection apparatuses in the related art, the present application only needs a single detection device to determine whether the water tank 2 is separated from the pedestal 1 and whether the water tank 2 is short of water by detecting the position of the float 5, decreasing the number of devices in the humidifier 100 to improve production efficiency and reduce production costs.

Therefore, the humidifier 100 according to the embodiments of the present disclosure has advantages of high production efficiency, low production cost and low energy consumption.

As shown in FIGS. 1 to 7, the humidifier 100 according to embodiments of the present disclosure includes the pedestal 1, the water tank 2, a float limiter 30, the float 5 and the detection device.

Figure 2:
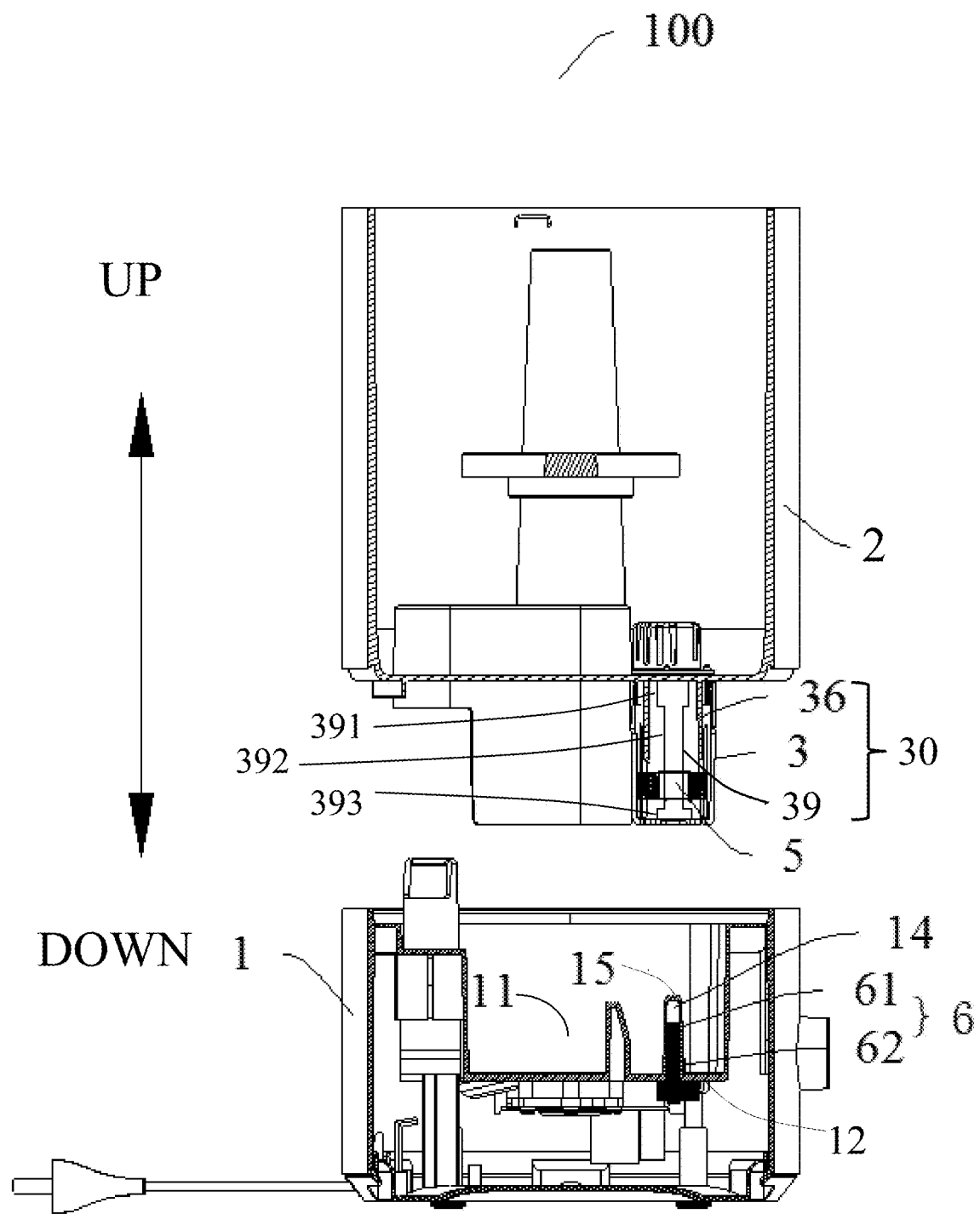
FIG. 2 is a schematic diagram showing a humidifier with a water tank separated in accordance with an embodiment of the present disclosure.
Figure 3:
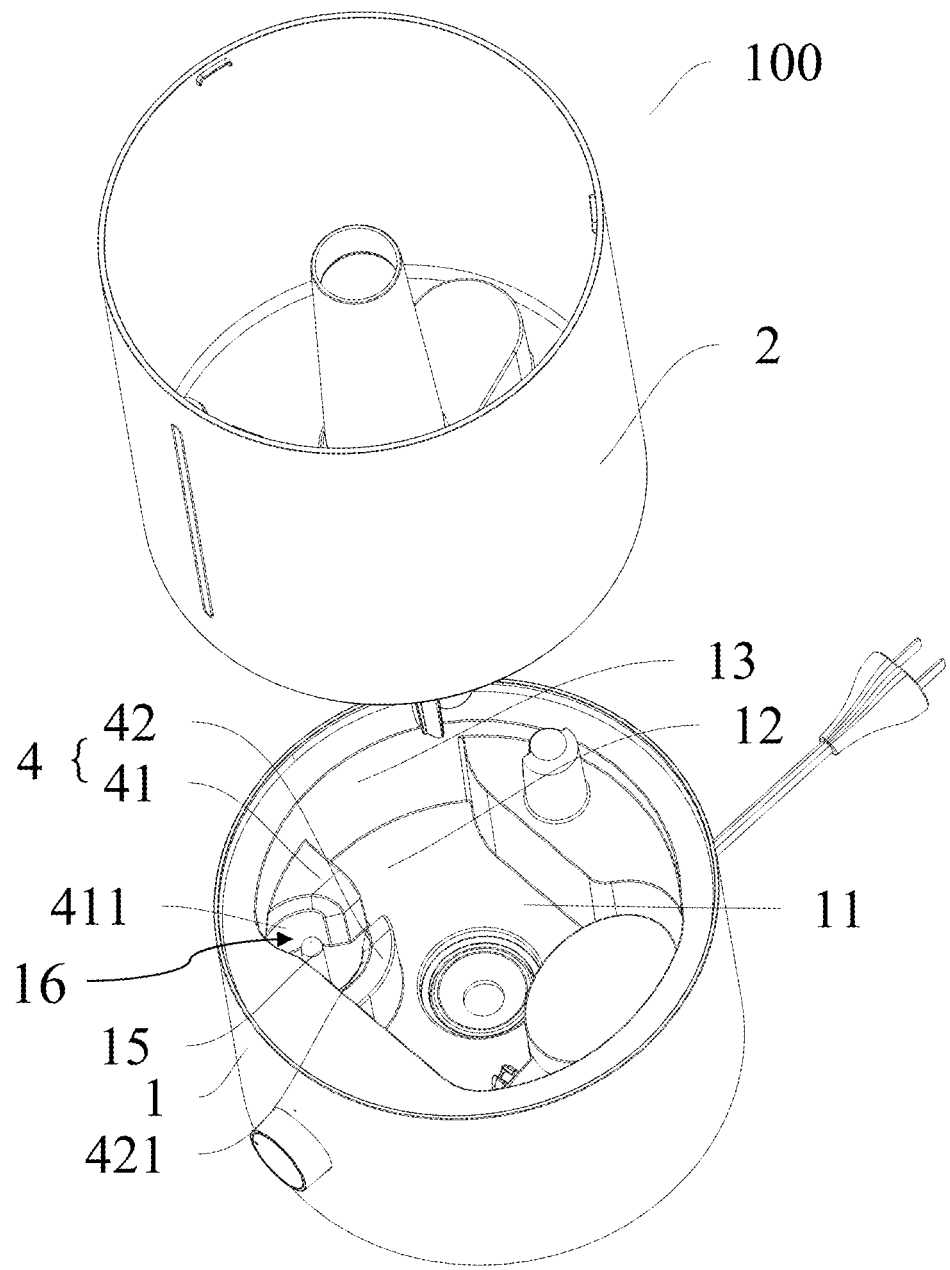
FIG. 3 is a perspective view showing a humidifier in accordance with an embodiment of the present disclosure.

As shown in FIG. 1, FIG. 2 and FIG. 3, the pedestal 1 has an atomization chamber 11, and liquid is atomized in the atomization chamber 11. Specifically, an opening of the atomization chamber 11 faces upwards; a housing of the pedestal 1 includes a first bottom wall 12 and a first side wall 13 that define the atomization chamber 11; and an outer edge of the first bottom wall 12 is coupled to a lower edge of the first side wall 13. The up-down direction is indicated by arrows in FIGS. 1 and 2.

As shown in FIG. 1 and FIG. 2, the water tank 2 is detachably mounted on the top of the pedestal 1, and the water tank 2 is used to deliver liquid to the atomization chamber 11. Specifically, a bottom plate of the water tank 2 has a water delivery port in communication with the atomization chamber 11, and a valve body is provided at the water delivery port.

The float limiter 30 is on the water tank 2 and can (extend into the atomization chamber 11) be fitted over the detection device, and the float 5 can be in the float limiter 30 and move (up and down) relative to the float limiter 30. As a result, when the water tank 2 is separated from the pedestal 1, the float 5 is separated from the atomization chamber 11 along with the float limiter 30. That is, the separation of the float 5 from the pedestal 1 represents the separation of the water tank 2 from the pedestal 1. When the water tank 2 is mounted on the top of the pedestal 1, the float 5 can float in the atomization chamber 11.

The preset space of the humidifier 100 is the atomization chamber 11, and the detection device can detect the position of the float 5 in the atomization chamber. The float 5 has a first preset position and a second preset position in the atomization chamber 11, and the first preset position is higher than the second preset position. The detection device is on the pedestal 1, and the detection device is used to detect the position of the float 5 to determine whether the water tank 2 is separated from the pedestal 1 and whether the atomization chamber 11 (the water tank 2) is short of water. When the detection device detects that the position of the float 5 in the atomization chamber 11 is higher than the first preset position in the atomization chamber 11, it is determined that the water tank 2 is separated from the pedestal 1; when the detection device detects that the position of the float 5 in the atomization chamber 11 is lower than the second preset position in the atomization chamber 11, it is determined that the water tank 2 is short of water.

Specifically, the first preset position is above the floating position of the float 5 in the atomization chamber 11, that is, when the float 5 is floating in the atomization chamber 11 that is not short of water, the float 5 is also always below the first preset position. The detection device can be used to detect the position of the float 5 in the atomization chamber 11. As a result, when the detection device detects that the float 5 is above the first preset position or when the detection device cannot detect the presence of the float 5 in the atomization chamber 11, it means that the float 5 is separating or has been separated from the atomization chamber 11, and such information can be sent to the central control system to determine that the water tank 2 is separated from the pedestal 1, in which case the humidifier 100 can turn off the atomizer and the fan, reducing the energy consumption of the humidifier 100.

When the water tank 2 is mounted on the top of the pedestal 1, the floating position of the float 5 in the up-down direction in the atomization chamber 11 can represent the water level in the atomization chamber 11. Specifically, the second preset position is close to a bottom wall of the atomization chamber 11, and the float 5 being below the second preset position means that the water level in the atomization chamber 11 is close to the bottom wall of the atomization chamber 11, indicating that the atomization chamber 11 is short of water, i.e., the water tank 2 is short of water. Therefore, when the detection device detects that the float 5 is below the second preset position, it means that the water level in the atomization chamber 11 is close to the bottom wall of the atomization chamber 11, and such information can be sent to the central control system, determining that the atomization chamber 11 (the water tank 2) is short of water, in order to turn off the atomizer and the fan (after a preset time), reducing the energy consumption of the humidifier 100.

As shown in FIG. 1 and FIG. 2, in some embodiments, the detection device extends upward from the bottom wall of the atomization chamber 11, and the float 5 can surround (or be fitted over) the detection device. Specifically, the float 5 is annular, and the float 5 is around the detection device, so that the detection device is used to detect the position of the float 5.

In some embodiments, the float 5 includes a base body and a magnetic portion, and the magnetic portion is on the base body. As a result, the float 5 is magnetic and has a density smaller than that of water, so that the float 5 can float in the atomization chamber 11. The detection device may be a Hall sensor or a magnetic reed switch. Thus, the Hall sensor or the magnetic reed switch can cooperate with the magnetic portion of the float 5 in order to detect the position of the float 5. For example, the detection device is a Hall sensor.

As shown in FIG. 1 and FIG. 2, the detection device includes a first sensor 61 and a second sensor 62, and the first sensor 61 is above the second sensor 62. For example, the first sensor 61 and the second sensor 62 are both Hall sensors, and each of the first sensor 61 and the second sensor 62 can realize magnetic induction with the float 5 around the sensors, so that the corresponding one of the first sensor 61 and the second sensor 62 can turn on or turn off a certain circuit, and the central control system can determine the position of the float 5.

The second sensor 62 is used to detect whether the position of the float 5 in the atomization chamber 11 is lower than the second preset position, to determine whether the water tank 2 (the atomization chamber 11) is short of water. Specifically, the second sensor 62 detects that the position of the float 5 in the atomization chamber 11 is lower than the second preset position, and it is determined that the water tank 2 (the atomization chamber 11) is short of water. The second sensor 62 may be at a predetermined position in the atomization chamber 11, so that when the atomization chamber 11 is short of water and the float 5 is below the second preset position, the second sensor 62 can detect the magnetism of the float 5 and determine the position of the float 5. For example, the second sensor 62 is below the second preset position, so that the second sensor 62 can detect the presence of the float 5 below the second preset position and send this information to the central control system to determine the shortage of water in the atomization chamber 11 (the water tank 2).

The first sensor 61 is used to detect whether the position of the float 5 in the atomization chamber 11 is higher than the first preset position, to determine whether the water tank 2 is separated from the pedestal 1.

In some embodiments, the first sensor 61 may detect that the position of the float 5 in the atomization chamber 11 is higher than the first preset position. The first sensor 61 is at a predetermined position in the atomization chamber 11.

When the float 5 in the atomization chamber 11 is separated from the atomization chamber 11 and reaches above the first preset position, the first sensor 61 can detect the magnetism of the float 5 and determine the position of the float 5. That is, the first sensor 61 may detect that the float 5 is above the first preset position, which means that the float 5 in the atomization chamber 11 is separating from the atomization chamber 11 and the water tank 2 is separating from the pedestal 1. For example, the first sensor 61 is above the first preset position and hence may detect that the float 5 in the atomization chamber 11 is above the first preset position and send this information to the central control system to determine the separation of the water tank 2 from the pedestal 1.

As shown in FIG. 1 and FIG. 2, in some embodiments, the first sensor 61 detects that the position of the float 5 in the atomization chamber 11 is lower than the first preset position. The first sensor 61 may detect that the float 5 is between the first preset position and the second preset position. Specifically, the first sensor 61 is at a predetermined position of the atomization chamber 11, so that when the float 5 is between the first preset position and the second preset position, the first sensor 61 can detect the magnetism of the float 5 and determine the position of the float 5. That is, when the first sensor 61 detects the float 5, it means that the float 5 floats in the atomization chamber 11 and the atomization chamber 11 is not short of water.

The first sensor 61 may detect that the float 5 is not between the first preset position and the second preset position, and the second sensor 62 may detect that the float 5 is not below the second preset position. In such a way, it is determined that the float 5 is separated from the atomization chamber 11 and the water tank 2 is separated from the pedestal 1. That is, when the first sensor 61 does not detect the presence of the float 5 between the first preset position and the second preset position and the second sensor 62 does not detect the presence of the float 5 below the second preset position, it means that the float 5 is not within detection ranges of the first sensor 61 and the second sensor 62, and the first sensor 61 and the second sensor 62 cannot detect whether the atomization chamber 11 is short of water. That is, the float 5 is taken away by the water tank 2, and it is determined that the water tank 2 is separated from the pedestal 1.

In some embodiments, the detection device includes a third sensor at a predetermined position in the atomization chamber 11. For example, the third sensor may be at a bottom of the atomization chamber 11. The third sensor is a Hall sensor, and the third sensor can realize magnetic induction with the magnetic portion of the float 5 and change a current level of a certain circuit within the third sensor according to the magnitude of the magnetism. The closer the float 5 is to the third sensor, the greater the magnetism sensed by the third sensor is. That is, the position of the float 5 can be determined by the current level of the circuit, and the position of the float 5 in the up-down direction can be determined.

The third sensor is used to detect whether the position of the float 5 in the atomization chamber 11 is lower than the second preset position and whether the position of the float 5 in the atomization chamber 11 is higher than the first preset position, to determine whether the water tank 2 is short of water and whether the water tank 2 is separated from the pedestal 1.

The third sensor may detect that the position of the float 5 in the atomization chamber 11 is below the second preset position and determine that the atomization chamber 11 is short of water. Specifically, when the atomization chamber 11 is short of water and the float 5 is below the second preset position, the float 5 is relatively close to the third sensor, and the magnetism of the float 5 detected by the third sensor is relatively great. Therefore, when the third sensor detects that the magnetism of the float 5 is greater than a preset value, it means that the third sensor detects that the float 5 is below the second preset position and sends this information to the central control system to determine the shortage of water in the atomization chamber 11 (the water tank 2).

The third sensor may detect that the position of the float 5 in the atomization chamber 11 is above the first preset position and determine that the water tank 2 is separated from the pedestal 1. Specifically, when the float 5 is above the first preset position, the float 5 is relatively far away from the third sensor and the magnetism of the float 5 detected by the third sensor is relatively small. Therefore, when the third sensor detects that the magnetism of the float 5 is smaller than a preset value, it means that the third sensor detects that the float 5 is above the first preset position and sends this information to the central control system to determine that the float 5 is separating from the atomization chamber 11 and the water tank 2 is separating from the pedestal 1.

In some embodiments, the third sensor may detect that the float 5 is not between the first preset position and the second preset position, and the third sensor may detect that the float 5 is not below the second preset position. As a result, it is determined that the water tank 2 is separated from the pedestal 1. Specifically, when the float 5 is above the first preset position, the float 5 is far away from the third sensor, and the third sensor can hardly sense the magnetism of the float 5. When the float 5 is between the first preset position and the second preset position or when the float 5 is below the second preset position, the third sensor can sense the magnetism of the float 5 and determine the position of the float 5 according to the magnetism of the float 5. Therefore, when the third sensor cannot detect the magnetism of the float 5, the float 5 is not within a detection range of the third sensor, and the third sensor cannot determine whether the atomization chamber 11 is short of water, that is, the float 5 is taken away by the water tank 2, and send this information to the central control system to determine that the water tank 2 is separated from the pedestal 1.

As shown in FIG. 1 and FIG. 2, in some embodiments, the first bottom wall 12 of the pedestal 1 at least partially protrudes upwards and forms a positioning groove 14 with a downward opening. The positioning groove 14 is spaced apart from the atomization chamber 11. The detection device is in the positioning groove 14. The float limiter 30 may surround the positioning groove 14, so that the float limiter 30 may be fitted over the detection device. Since the positioning groove 14 is spaced apart from the atomization chamber 11, the positioning groove 14 is not in communication with the atomization chamber 11, so that the detection device is not in contact with the water in the atomization chamber 11 and can be protected. In some embodiments, the first sensor 61 and the second sensor 62 are both in the positioning groove 14. That is, a protruding portion 15 of the first bottom wall 12 defines the positioning groove 14. In this way, the first sensor 61 and the second sensor 62 can be prevented from directly contacting the liquid in the atomization chamber 11, and it is convenient to detect the float 5. For example, the first sensor 61 is in the positioning groove 14 and away from the opening of the positioning groove 14, and the second sensor 62 is in the positioning groove 14 and adjacent to the downward opening of the positioning groove 14.

In some embodiments, the third sensor is in the positioning groove 14, that is, the protruding portion 15 of the first bottom wall 12 defines the positioning groove 14. In this way, the third sensor can be prevented from directly contacting the liquid in the atomization chamber 11, and it is convenient to detect the float 5. For example, the third sensor is adjacent to the downward opening of the positioning groove 14.

As shown in FIG. 1 to FIG. 7, in some embodiments, the float limiter 30 includes a float cover 3, and the float cover 3 is detachably mounted to a bottom of the water tank 2.

The float cover 3 may be fitted over the detection device. The float cover 3 has a floating chamber 31 in communication with the atomization chamber 11, and the float 5 can move along the up-down direction in the floating chamber 31. Specifically, a bottom 38 of the float cover 3 has a first through hole 32, and the detection device may be inserted into the first through hole 32, so that the float cover 3 can be fitted over the protruding portion 15, that is, the protruding portion 15 can enter the floating chamber 31 of the float cover 3 through the first through hole 32, and the float can move up and down around the protruding portion 15 conveniently. Therefore, a distance between the float and the detection device (the first sensor 61 and the second sensor 62) can become small, and the detection device can detect the position of the float 5 conveniently.

Figure 6:
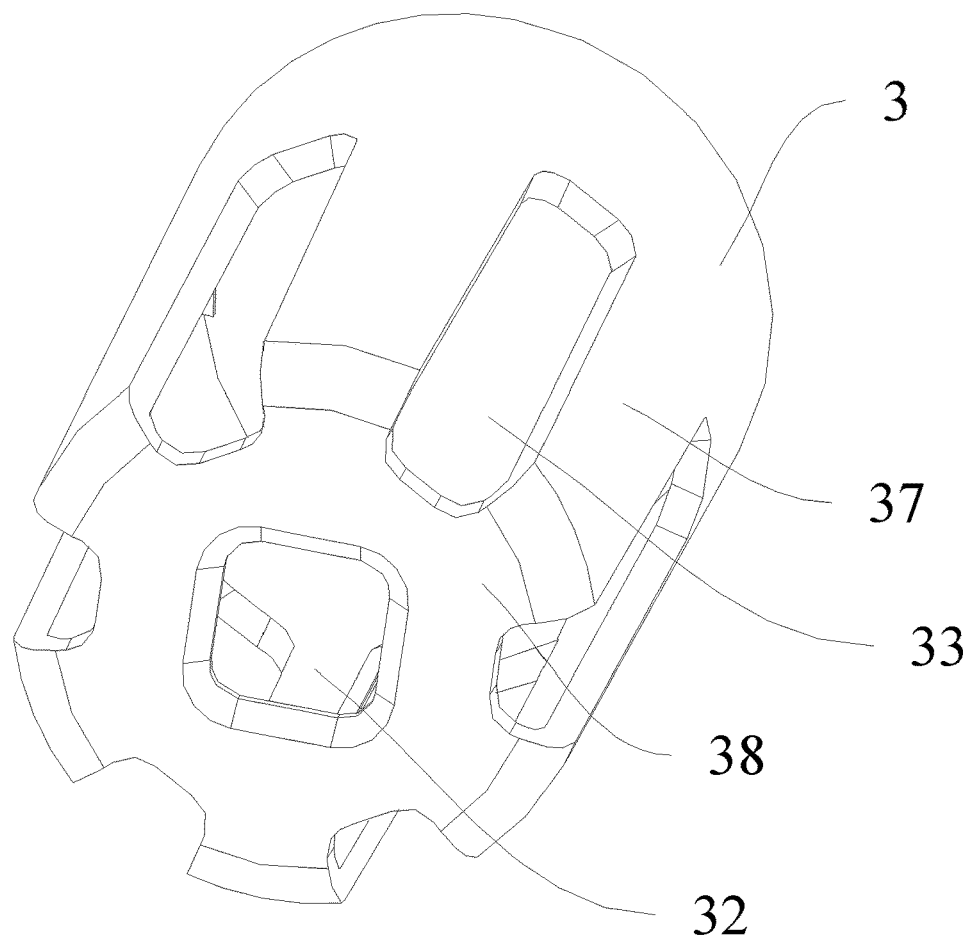
FIG. 6 is a schematic diagram showing a float cover in accordance with an embodiment of the present disclosure.
Figure 7:
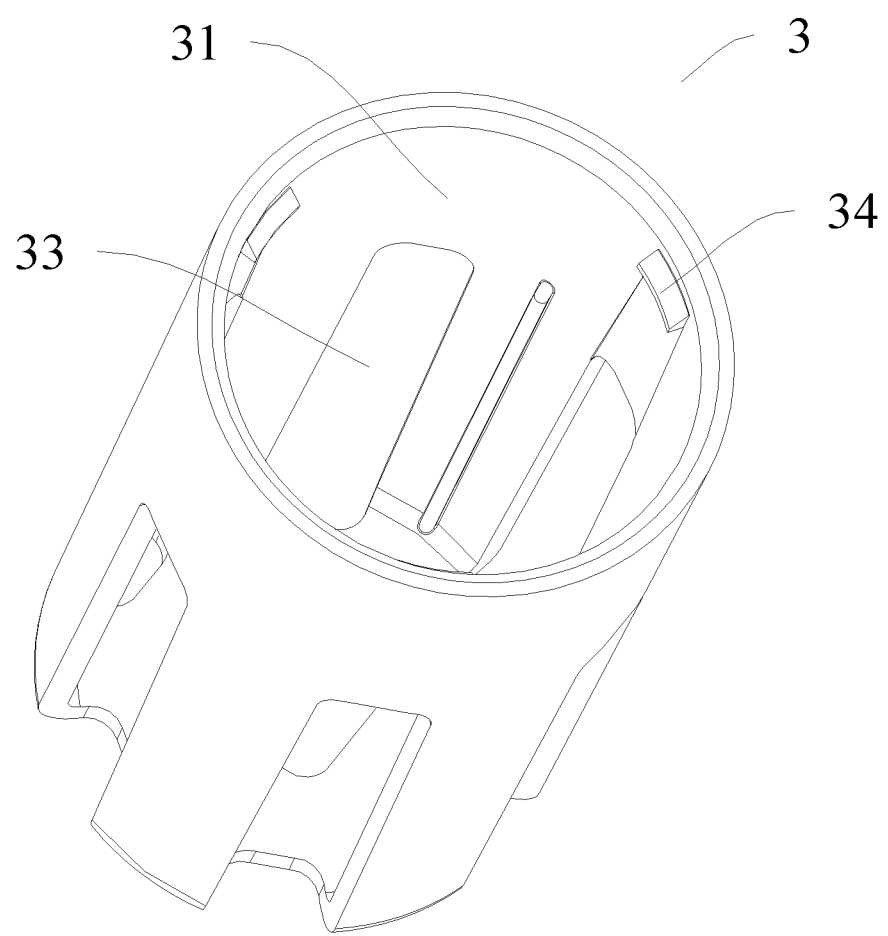
FIG. 7 is a schematic diagram showing a float cover in accordance with an embodiment of the present disclosure.

As shown in FIG. 6 and FIG. 7, the float cover 3 has a plurality of second through holes 33, and the floating chamber 31 is in communication with the atomization chamber 11 through the second through holes 33. The plurality of second through holes 33 are along a peripheral direction of the float cover 3, and each second through hole 33 is in the bottom 38 of the float cover 3 and in the side wall 37 of the float cover 3. Specifically, each second through hole 33 extends upwards from a bottom surface of the float cover 3 and penetrates the side wall 37 of the float cover 3 in an inner-outer direction of the float cover 3, in which the inner-outer direction is perpendicular to the up-down direction. The floating chamber 31 is inside the float cover 3. Each second through hole 33 penetrates the bottom surface of the float cover 3 in the up-down direction and penetrates the side wall 37 of the float cover 3 in the inner-outer direction of the float cover 3, so that the floating chamber 31 is in communication with the atomization chamber 11 through the second through holes 33. As a result, it is convenient for the liquid in the atomization chamber 11 to enter the floating chamber 31, and a water level in the floating chamber 31 is consistent with the water level in the atomization chamber 11.

Figure 4:
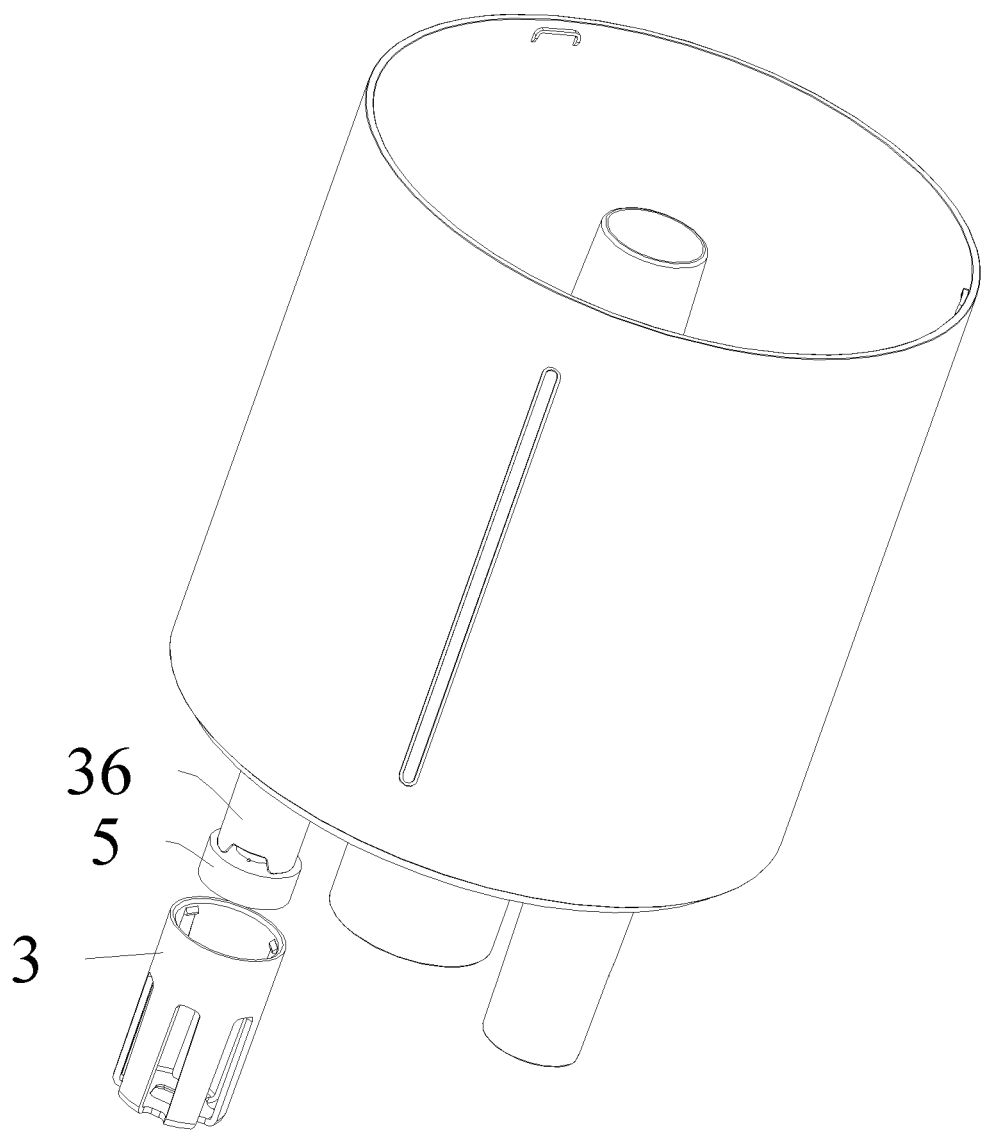
FIG. 4 is a schematic diagram showing a water tank in accordance with an embodiment of the present disclosure.
Figure 5:
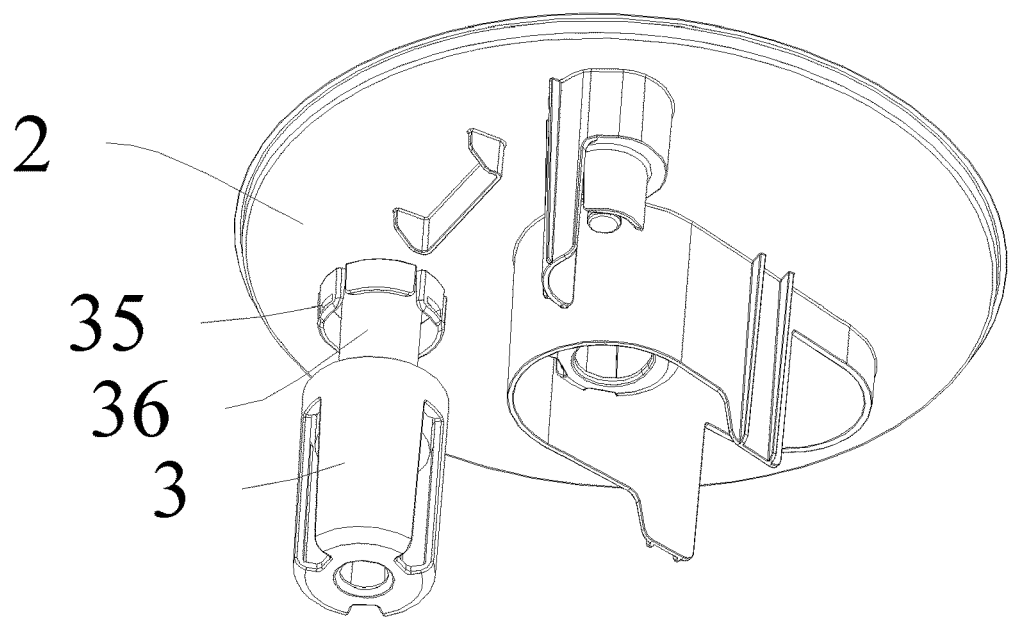
FIG. 5 is a schematic diagram showing a bottom of a water tank in accordance with an embodiment of the present disclosure.

As shown in FIG. 4 and FIG. 5, in some embodiments, the float limiter 30 further includes a stopper 36; the stopper 36 is at the bottom of the water tank 2 and extends downwards by a predetermined size; and the stopper 36 is within the floating chamber 31 and above the float 5. In such way, the stopper 36 can cooperate with the bottom of the float cover 3 to limit the position of the float 5 in the up-down direction, to limit the position of the float 5 floating in the atomization chamber 11, and facilitate the arrangement of the detection device (the first sensor 61 and the second sensor 62).

As shown in FIGS. 5 and 7, in some embodiments, one of a top of the float cover 3 and the bottom of the water tank 2 includes a snap 34, and the other of the top of the float cover 3 and the bottom of the water tank 2 includes a slot 35 fitted with the snap 34. Specifically, the snap 34 may be snapped in the slot 35, so that the float cover 3 may be coupled to the water tank 2. For example, an inner wall surface of the top of the float cover 3 includes the snap 34, and a lower surface of the bottom of the water tank 2 includes the slot 35.

In some embodiments, as shown in FIG. 2, the float limiter 30 includes a limiting tube 39 extending in the up-down direction, and a top of the limiting tube 39 is coupled to the bottom of the water tank 2. An outer surface of a middle portion of the limiting tube 39 is recessed inwards to form a chute, and the float 5 is annular and is movably fitted in the chute along the up-down direction. In this way, the chute can limit the position of the float 5 in the up-down direction, the position of the float 5 floating in the atomization chamber 11 can be limited conveniently, and the arrangement of the detection device (the first sensor 61 and the second sensor 62) can be facilitated. Moreover, the protruding portion 15 extends into the limiting tube 39, so that it is convenient for the float to move up and down around the protruding portion 15. The distance between the float and the detection device (the first sensor 61 and the second sensor 62) can become small, and the detection device can detect the position of the float 5 conveniently.

In some embodiments, the limiting tube 39 includes a first tube segment 391, a second tube segment 392, and a third tube segment 393 connected in sequence, and each of the first tube segment 391, the second tube segment 392, and the third tube segment 393 extends in the up-down direction. A top of the first tube segment 391 is coupled to the bottom of the water tank 2. A diameter of the second tube segment 392 is smaller than a diameter of the first tube segment 391 and a diameter of the third tube segment 393, so that the first tube segment 391, the second tube segment 392 and the third tube segment 393 define the chute, and the float 5 is fitted over the second tube segment 392 and movable in the up-down direction.

In some embodiments, the detection device includes a camera. The camera can capture an image of the float 5 in the atomization chamber 11 and transmit it to the central control system, to detect the position of the float 5. It is convenient for the detection device to detect the position of the float 5 and determine whether the water tank 2 is separated from the pedestal 1 and whether the water tank 2 (the atomization chamber 11) is short of water.

As shown in FIGS. 1 to 3, in some embodiments, the humidifier 100 according to the embodiments of the present disclosure further includes a positioning member 4. An inner wall surface of the positioning member 4 and a side wall of the atomization chamber 11 define a guide groove 16 with an upward opening. The guide groove 16 constitutes a part of the atomization chamber 11 and is used to guide the float limiter 30. Specifically, the positioning member 4 includes a first positioning plate 41 and a second positioning plate 42 at the bottom of the atomization chamber 11. The first positioning plate 41 is spaced apart from the second positioning plate 42. The first positioning plate 41 and the second positioning plate 42 are spaced apart so that the water can enter the guide groove 16 from a passage between the first positioning plate 41 and the second positioning plate 42. The water can easily enter the guide groove 16 and a water level in the guide groove 16 is consistent with the water level of the atomization chamber 11. An inner wall surface 411 of the first positioning plate 41 and an inner wall surface 421 of the second positioning plate 42 are both arc-shaped surfaces, and the arc-shaped surfaces extend in the up-down direction. The inner wall surface 411 of the first positioning plate 41, the inner wall surface 421 of the second positioning plate 42, and the side wall of the atomization chamber 11 (a part of the first side wall 13) define the guide groove 16, which makes it convenient for the float limiter 30 (the float cover 3) to reach a correct position.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience of description and do not indicate or imply that the device or element referred to must have a particular orientation, or be constructed and operated in a particular orientation. Thus, these terms shall not be construed as limitation on the present disclosure.

In addition, terms such as "first" and "second" are merely used for descriptive purposes and cannot be understood as indicating or implying relative importance or the number of technical features indicated. Thus, the features associated with "first" and "second" may explicitly or implicitly include at least one of the features. In the description of the present disclosure, unless otherwise specifically defined, "a plurality of" means at least two, such as two, three, etc.

In the present disclosure, unless otherwise explicitly specified and defined, the terms "mounted," "coupled," "connected," "fixed" and the like are used broadly, and may be, for example, fixed connections, detachable connections, or integral connections; may also be mechanical or electrical connections or intercommunication; may also be direct connections or indirect connections via intermediate media; may also be inner communications or interactions of two elements. For those skilled in the art, the specific meaning of the above terms in the present disclosure can be understood according to the specific circumstances.

In the present disclosure, unless otherwise explicitly specified and defined, a structure in which a first feature is "on" or "below" a second feature may include an embodiment in which the first feature is in direct contact with the second feature, and may also include an embodiment in which the first feature and the second feature are not in direct contact with each other, but are contacted via an intermediate medium formed therebetween. Furthermore, a first feature "on," "above," or "on top of" a second feature may include an embodiment in which the first feature is right or obliquely "on," "above," or "on top" of the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the above embodiments have been shown and described, it can be understood that the above embodiments are exemplary and shall not be understood as limitation to the present disclosure, and changes, modifications, alternatives and variations can be made in the above embodiments within the scope of the present disclosure.

What is claimed is:

1. A humidifier comprising:
a pedestal;
a water tank detachably mounted on a top of the pedestal;
a float on the water tank and movable relative to the water tank;
a detection device on the pedestal and configured to detect a position of the float in a preset space of the humidifier, wherein the position of the float indicates whether at least one of (i) the water tank is separated from the pedestal, and (ii) the water tank is short of water; and
a float limiter on the water tank and fitted over the detection device, wherein the float is within the float limiter and is movable relative to the float limiter,
wherein:
the float limiter comprises a limiting tube extending in an up-down direction, and a top of the limiting tube is coupled to a bottom of the water tank; and
an outer surface of a middle portion of the limiting tube is recessed inwards and forms a chute, and the float is annular and is fitted in the chute and movable along the up-down direction.

2. The humidifier according to claim 1, wherein:
the float limiter comprises a float cover detachably mounted to a bottom of the water tank and fitted over the detection device; and
the float cover has a floating chamber, and the float is movable along an up-down direction in the floating chamber.

3. The humidifier according to claim 2, wherein:
the float cover has a first through hole in a bottom of the float cover, and the detection device is insertable into the first through hole; and
the float cover has a plurality of second through holes, and the floating chamber is in communication with an atomization chamber of the pedestal by the plurality of second through holes.

4. The humidifier according to claim 3, wherein the plurality of second through holes are along a peripheral direction of the float cover.

5. The humidifier according to claim 3, wherein each of the plurality of second through holes penetrates a bottom surface of the float cover in the up-down direction and penetrates a side wall of the float cover in an inner-outer direction of the float cover, the inner-outer direction of the float cover being perpendicular to the up-down direction.

6. The humidifier according to claim 2, wherein the float limiter comprises a stopper at the bottom of the water tank and extending downwards by a predetermined size, and the stopper is within the floating chamber and above the float.

7. The humidifier according to claim 2, wherein one of a top of the float cover and the bottom of the water tank comprises a snap, and the other of the top of the float cover and the bottom of the water tank comprises a slot fitted with the snap.

8. The humidifier according to claim 1, wherein:
the pedestal comprises a first bottom wall, and the first bottom wall at least partially protrudes upwards and forms a positioning groove with a downward opening; and
the detection device is in the positioning groove, and the float limiter surrounds the positioning groove.

9. The humidifier according to claim 8, wherein
the float limiter includes a float cover detachably mounted to a bottom of the water tank and fitted over the detection device; and
a protruding portion of the first bottom wall defines the positioning groove, and the float cover is fitted over the protruding portion.

10. The humidifier according to claim 1, wherein:
the limiting tube comprises a first tube segment, a second tube segment, and a third tube segment connected in sequence;
a top of the first tube segment is coupled to the bottom of the water tank;
a diameter of the second tube segment is smaller than a diameter of the first tube segment and a diameter of the third tube segment, and the first tube segment, the second tube segment and the third tube segment define the chute; and
the float is fitted over the second tube segment and movable along the up-down direction.

11. The humidifier according to claim 1, further comprising a positioning member,
wherein the positioning member comprises a first positioning plate and a second positioning plate at a bottom of an atomization chamber, and the first positioning plate is spaced apart from the second positioning plate;
an inner wall surface of the first positioning plate and an inner wall surface of the second positioning plate are both arc-shaped surfaces; and
the inner wall surface of the first positioning plate, the inner wall surface of the second positioning plate, and a side wall of the atomization chamber of the pedestal define a guide groove with an upward opening; and the guide groove constitutes a part of the atomization chamber and guides the float limiter.

12. The humidifier according to claim 1, wherein:
the float comprises a base body and a magnetic portion, and the magnetic portion is on the base body; and
the detection device is a Hall sensor.

13. The humidifier according to claim 1, wherein the detection device comprises a camera.

14. The humidifier according to claim 1, wherein the float is annular and is around the detection device.

15. The humidifier according to claim 1, wherein:
the pedestal has an atomization chamber, and the float is movable into the atomization chamber, the preset space of the humidifier being the atomization chamber;
the water tank is determined to be separated from the pedestal in response to detecting, by the detection device, that a position of the float in the atomization chamber is higher than a first preset position in the atomization chamber; the water tank is determined to be short of water in response to detecting, by the detection device, that the position of the float in the atomization chamber is lower than a second preset position in the atomization chamber; and the first preset position is higher than the second preset position.

16. The humidifier according to claim 15, wherein:
the detection device comprises a first sensor and a second sensor, the first sensor being above the second sensor; and
the second sensor is configured to detect whether the position of the float in the atomization chamber is lower than the second preset position, and the first sensor is configured to detect whether the position of the float in the atomization chamber is higher than the first preset position.

17. The humidifier according to claim 15, wherein the detection device comprises a third sensor configured to detect whether the position of the float in the atomization chamber is lower than the second preset position and whether the position of the float in the atomization chamber is higher than the first preset position.

* * * * *